No. 636,240. Patented Nov. 7, 1899.
F. O. BIBLE.
THINNING ATTACHMENT FOR SEEDING OR LIKE MACHINES.
(Application filed Aug. 12, 1899.)
(No Model.)
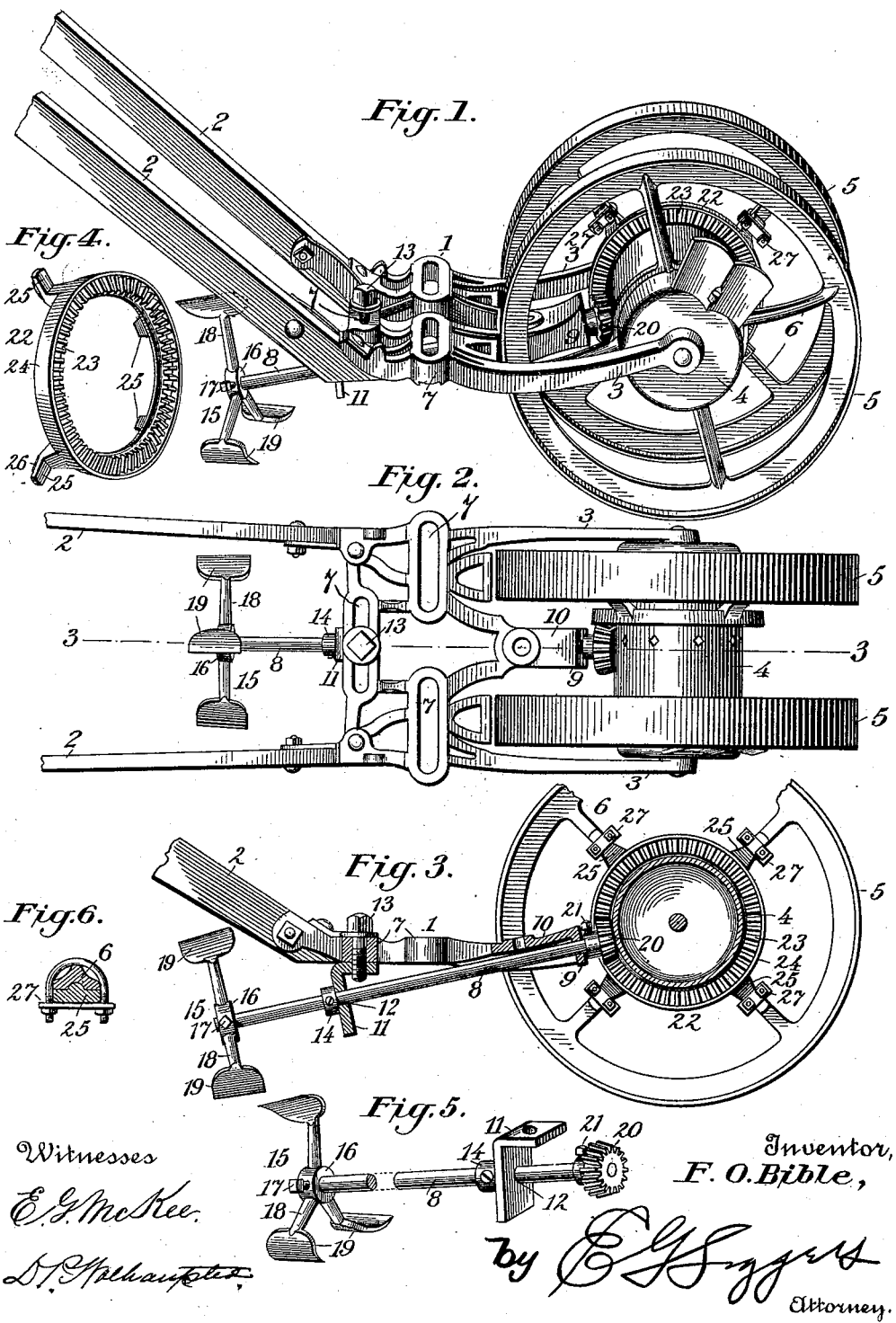
Witnesses
E. G. McKee
D. T. Walhaupter
Inventor,
F. O. Bible,
by E. G. Siggers
Attorney.

UNITED STATES PATENT OFFICE.

FRANK OSCAR BIBLE, OF CHIPPEWA FALLS, WISCONSIN.

THINNING ATTACHMENT FOR SEEDING OR LIKE MACHINES.

SPECIFICATION forming part of Letters Patent No. 636,240, dated November 7, 1899.

Application filed August 12, 1899. Serial No. 727,018. (No model.)

*To all whom it may concern:*

Be it known that I, FRANK OSCAR BIBLE, a citizen of the United States, residing at Chippewa Falls, in the county of Chippewa and State of Wisconsin, have invented a new and useful Thinning Attachment for Seeding and Like Machines, of which the following is a specification.

This invention relates to an improved attachment for seeding and like machines for converting the latter into a thinning or hoeing device having simple and efficient means for thinning out any garden vegetables that may be planted in rows.

To this end the invention primarily contemplates a thinning or hoeing attachment consisting of a minimum number of parts which may be readily attached to an ordinary garden-seeding or like machine and also easily and quickly removed therefrom when the machine is desired for seeding or other purposes. In other words, the invention contemplates an extra attachment for that type of garden-seeding or like machines which are provided not only with means for sowing seed in rows, but also with attachments for cultivating and working the soil in the usual way.

With these and other objects in view, and which will more readily appear as the nature of the invention is better understood, the same consists in the novel construction, combination, and arrangement of parts hereinafter more fully described.

The essential features of the invention are necessarily susceptible to some modification without departing from the spirit or scope thereof; but the preferred embodiment of the improvements is shown in the accompanying drawings, in which—

Figure 1 is a perspective view of an ordinary garden-seeding machine having the usual attachments removed and equipped with the thinning or hoeing attachments contemplated by the present invention. Fig. 2 is a top plan view of the construction shown in Fig. 1. Fig. 3 is a longitudinal sectional view on the line 3 3 of Fig. 2. Fig. 4 is a detail in perspective of the gear-ring, which is adapted to be clamped to one of the ground-wheels of the seeder. Fig. 5 is a detail in perspective of the hoe-shaft with the attached hoe-spider at one end and the pinion-gear at the other end. Fig. 6 is a detail sectional view showing the fastening connection between one of the gear-ring arms and a wheel-spoke.

Like numerals of reference designate corresponding parts in the several figures of the drawings.

While the attachment forming the subject-matter of the present application is capable of application to different types of garden-seeding or like machines, still the same is preferably designed for use in connection with the type of garden-seeder shown in the drawings. This form of garden-seeding machine is provided with a main carrying bracket or casting 1, to the rear side of which is bolted or otherwise suitably fastened the handles 2, and at its front side the said bracket or casting is provided with a forwardly-extending yoke 3, which rotatably supports therein the seed drum or hopper 4, with which is associated a pair of spaced ground-wheels 5, also arranged to rotate within the yoke 3 of the bracket or casting. The ground-wheels 5 are provided with the spokes 6, which in the type of seeder shown in the drawings are usually angular in cross-section, and said carrying bracket or casting of the machine constitutes a support or carrier for the shovels and other attachments forming the usual appurtenances thereof. This carrying bracket or casting is of such a formation as to permit of the ready application of the thinning or hoeing attachment to the machine, as the same is provided in rear of its forwardly-extending yoke 3 with a plurality of transversely-disposed and longitudinally-slotted heads 7, the rearmost of which lies between the attached ends of the handles 2, as plainly shown in Figs. 1 and 2 of the drawings.

The features of construction described constitute the parts of the ordinary garden-seeding machine with which the herein-described attachment is associated, and when this attachment is used it is of course necessary to remove from the carrying bracket or casting such parts as may be attached thereto, although the said drum or hopper 4 does not interfere in the least with the operation of the attachment. In carrying out the invention there is employed a single rotatable hoe-shaft 8, which is arranged beneath the carrying bracket or casting 1 of the machine and is preferably supported at an inclination in order to secure effective work. The forward end of the rotatable hoe-shaft 8 is sustained in a bearing 9, formed in the forwardly-extending bearing-arm 10, projected centrally from the carrying bracket or casting 1, at the front side thereof, and extending between the planes of the ground-wheels 5 in order to dispose the front end of the hoe-shaft in position for having motion imparted thereto. The rear end portion of the hoe-shaft 8 is properly supported by means of the approximately L-shaped bearing-hanger 11. This bearing-hanger 11 is provided in its pendent portion with the bearing-opening 12, receiving the shaft 8, and the approximately horizontal flange at the upper end of said bearing-hanger is held clamped against the rearmost slotted head 7 of the carrying bracket or casting by means of a fastening-bolt 13, passing through the slot of said head and also through the flange of the bearing-hanger. The said bearing-hanger is thus clamped rigidly in position to form a proper bearing for the rear end portion of the hoe-shaft, while at the same time being readily detachable to permit of the shaft being removed from the gear when it is not desirable to use the same to prevent longitudinal displacement thereof in one direction. The same has fitted thereto at one side of the hanger 11 a stop-collar 14.

The hoe-shaft 8 extends at its rear end beyond the carrying bracket or casting 1 and has fitted thereon a hoe-spider 15. This spider essentially consists of a central hub or collar 16, detachably held on the shaft by the set-screw 17, and a plurality of blade-arms 18, extending radially from the hub 16 and provided at their outer ends with widened flattened blades 19, the blades of the several arms being curved in the same direction and also disposed obliquely to the radial plane of the arms, whereby the cutting edges will enter the ground at an angle and have a shear cut upon the vegetables being thinned, thereby insuring a cutting out of the vegetables as perfectly as could be accomplished by the ordinary tedious hand process of thinning. In this connection it will be understood that the hoe-spider may be constructed with any number of blade-arms as may be found desirable.

To provide for communicating motion to the hoe-shaft, the same has fitted to the extreme forward end thereof a bevel pinion-gear 20, detachably held in place by a set-screw 21, which permits of the removal of the same when the attachment is being disconnected from the machine, and the said bevel pinion-gear 20 meshes with the teeth of a drive-gear ring 22. The drive-gear ring 22 is of a sufficient size to fit over or encircle the said drum or hopper 4 and is arranged at the inner side of one of the ground-wheels 5. Said drive-gear ring 22 is formed with a bevel-gear 23 at one side and with a retaining-flange 24, encircling the teeth of the gear, at the outer peripheral edge thereof, so as to insure the pinion-gear 20 being held in mesh therewith. The drive-gear ring 22 is further provided at the peripheral edge thereof with a plurality of radially-disposed fastening-arms 25, offset from the side of the ring opposite the gear-teeth and projecting beyond the periphery thereof. The said fastening-arms 25 are preferably provided at one side with ribs 26, which interlock with the spokes 6 of the ground-wheel, and said arms 25 are securely clamped to said spokes by means of the clip-bolts 27, which encircle the said arms 25 and the spokes against which they fit, as plainly shown in the drawings. While the clip-bolts 27 permit of the ready attachment and detachment of the gear-ring, still this ring may be left at all times upon the machine without interfering with the operation of seeding.

In the operation of the machine the same is carried over the row of vegetables lengthwise of the row, so that the rotating hoe-spider will carry the blades thereof into the ground and remove the vegetables for the purpose of thinning the same out. This operation is usually accomplished by hand and is exceedingly tiresome, whereas the present invention provides for accomplishing the desired result with a minimum amount of labor. Furthermore, some gardeners in order to avoid the tedious hand-thinning operation sometimes sow the seed thin, with the result of having the crop thin in a great many places; but this is rendered entirely unnecessary by the use of the present invention.

Other advantages will appear to those skilled in the art, and it will be understood that various changes in the size, shape, proportion, and minor details of construction may be resorted to without departing from the spirit or sacrificing any of the advantages of the invention.

Having thus described the invention, what is claimed is—

1. In a thinning or hoeing attachment for seeding and like machines, the combination with the carrying-bracket and ground-wheels of the machine, of a rotatable hoe-shaft detachably supported beneath said carrying-bracket and carrying at its rear end a plurality of hoe-blades, and a removable gear associated with one of the ground-wheels to transmit motion to the hoe-shaft, substantially as set forth.

2. In a thinning or hoeing attachment for seeding and like machines, the combination with the carrying-bracket and ground-wheels of the machine, of a rotatable hoe-shaft detachably supported beneath said bracket, and carrying at its rear end a plurality of hoe-blades, a pinion-gear fitted to the front end of said shaft, and a gear-ring encircling the drum or hopper of the machine, and detachably clamped to one end of the ground-wheels, substantially as set forth.

3. In an attachment of the class described, the combination with the carrying-bracket and ground-wheels of a seeding or like machine, of a bearing-hanger pendent from, and detachably fastened to said bracket, a rotatable hoe-shaft arranged beneath the bracket and journaled in the bearing-hanger, said hoe-shaft carrying at its front end a pinion-gear and at its rear end a plurality of hoe-blades, and a gearing detachably clamped to one of the ground-wheels, substantially as set forth.

4. In a machine of the class described, the combination with the carrying-bracket and the ground-wheels of a seeding or like machine, of a rotatable hoe-carrying shaft, detachably supported beneath the carrying-bracket, and having at its front end a pinion-gear, a gear-ring encircling the drum or hopper of the machine, and provided with a peripheral series of offset fastening-arms engaging with the spokes of one of the ground-wheels and fastening-clips embracing said arms and the contiguous spokes, substantially as set forth.

5. In a machine of the class described, the combination with the carrying-bracket, of a rotatable hoe-shaft supported at an inclination beneath said bracket, and a hoe-spider fitted to the rear end of said shaft, said spider being provided with a plurality of radial arms having at their outer ends flattened curved blades disposed obliquely to the radial plane of the arms, substantially as set forth.

In testimony that I claim the foregoing as my own I have hereto affixed my signature in the presence of two witnesses.

FRANK OSCAR BIBLE.

Witnesses:
ELSIE M. LOOMIS,
SARAH J. JENKINS.